US011542646B2

(12) United States Patent
Ueda et al.

(10) Patent No.: US 11,542,646 B2
(45) Date of Patent: Jan. 3, 2023

(54) EMBROIDERY HOOP

(71) Applicant: BROTHER KOGYO KABUSHIKI KAISHA, Nagoya (JP)

(72) Inventors: Daisuke Ueda, Seto (JP); Nobuhiko Funato, Gifu (JP); Midori Komada, Matsusaka (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/928,320

(22) Filed: Jul. 14, 2020

(65) Prior Publication Data
US 2020/0407901 A1 Dec. 31, 2020

(51) Int. Cl.
D05C 9/04 (2006.01)
F16B 2/18 (2006.01)

(52) U.S. Cl.
CPC . D05C 9/04 (2013.01); F16B 2/18 (2013.01)

(58) Field of Classification Search
CPC ... D05C 9/10; D05C 9/12; D05C 1/02; D05C 1/04; D05B 91/06; D05B 91/10; D05B 39/005; D05B 39/00; F16B 2/18
See application file for complete search history.

(56) References Cited

U.S. PATENT DOCUMENTS

| 4,221,497 A | * | 9/1980 | Farrell | F16B 2/185 403/344 |
| 7,665,928 B2 | * | 2/2010 | Winefordner | B62K 25/02 403/322.4 |
| 7,828,340 B2 | * | 11/2010 | Heelan, Jr. | F16L 33/12 285/409 |
| 2004/0040186 A1 | * | 3/2004 | Wilson | D05C 1/04 38/102.2 |

(Continued)

FOREIGN PATENT DOCUMENTS

JP   S62-091009 U   6/1987
JP      3110890 U   7/2005

(Continued)

OTHER PUBLICATIONS

Aug. 4, 2020 International Preliminary Report on Patentability issued in International Patent Application No. PCT/JP2018/047485.

(Continued)

Primary Examiner — Alissa L Hoey
Assistant Examiner — Patrick J. Lynch
(74) Attorney, Agent, or Firm — Oliff PLC

(57) ABSTRACT

An embroidery machine includes an outer ring, an inner ring, a pair of screw mounts, a lever, a nut, and an adjusting screw. The outer ring includes a dividing portion. The inner ring and the outer ring holds a workpiece therebetween. The screw mounts are disposed at the dividing portion to oppose each other. The lever is disposed at one of the screw mounts (Continued)

and rotatable about a rotation axis. The nut is slidably held in the lever at a position eccentric from the rotation axis. The adjusting screw is mounted across the screw mounts and threadedly engaged with the nut. A shortest distance between a first surface of the one of the screw mounts and the nut is defined as a specific distance. The specific distance when the lever is at a second position is longer than the specific distance when the lever is at a first position.

9 Claims, 8 Drawing Sheets

(56) References Cited

U.S. PATENT DOCUMENTS

| | | | |
|---|---|---|---|
| 2005/0089362 A1* | 4/2005 | Lin | F16B 7/04 403/314 |
| 2005/0229830 A1 | 10/2005 | Hori | |
| 2008/0219760 A1* | 9/2008 | Wu | B62K 21/125 403/322.4 |

FOREIGN PATENT DOCUMENTS

| | | |
|---|---|---|
| JP | 2005-279011 A | 10/2005 |
| JP | 2007-118921 A | 5/2007 |
| JP | 2007-139056 A | 6/2007 |
| JP | 2008-279184 A | 11/2008 |

OTHER PUBLICATIONS

Apr. 9, 2019 International Search Report issued in International Patent Application No. PCT/JP2018/047485.

* cited by examiner

EMBROIDERY HOOP

CROSS-REFERENCE TO RELATED APPLICATION

This is a continuation application of International Application No. PCT/JP2018/047485 filed on Dec. 25, 2018 which claims priority from Japanese Patent Application No. 2018-015741 filed on Jan. 31, 2018. The entire contents of the earlier applications are incorporated herein by reference.

TECHNICAL FIELD

Aspects the disclosure relate to an embroidery hoop.

BACKGROUND

In a known embroidery hook, an outer ring is tightened against an inner ring. The known embroidery hoop includes the outer ring, the inner ring, a pair of screw mounts, an adjusting screw, an operation shaft, and a coupling mechanism. The pair of screw mounts are disposed at a dividing portion which divides a portion of the outer ring. The adjusting screw is mounted across the pair of screw mounts to adjust a gap between the pair of screw mounts. A user operates the operation shaft to pivot the adjusting screw. The coupling mechanism transmits a pivot torque of the operation shaft to the adjusting screw. When the adjusting screw is pivoted by the user using the operation shaft, the gap between the pair of screw mounts decreases. In the embroidery hoop, the outer ring is tightened against the inner ring while clamping a fabric therebetween.

SUMMARY

In the above-described embroidery hoop, when the user tightens the outer ring against the inner ring, a reaction force from the inner ring acts on the outer ring. Thus, an excessive force may be required for the user to rotate the adjusting screw to such a rotation position as to property tighten the hoop. Hoop tightening may be troublesome for the user.

Aspects of the disclosure provide an embroidery hoop facilitating hoop tightening.

According to one or more aspects of the disclosure, an embroidery hoop includes an outer ring, an inner ring, a pair of screw mounts, a lever, a nut, and an adjusting screw. The outer ring includes a ring-shaped portion, and a dividing portion dividing a portion of the ring-shaped portion. The inner ring is fitted inside the outer ring to hold a workpiece therebetween. The pair of screw mounts are disposed at the dividing portion to oppose each other. The lever is disposed at one of the pair of screw mounts and rotatable about a rotation axis between a first position and a second position. The nut is slidably held in the lever at a position eccentric from the rotation axis. The adjusting screw is mounted across the pair of screw mounts and threadedly engaged with the nut. The one of the pair of screw mounts has a first surface facing the other screw mount, and a shortest distance between the first surface and the nut is defined as a specific distance. The specific distance when the lever is at the second position is longer than the specific distance when the lever is at the first position.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Figure 1:
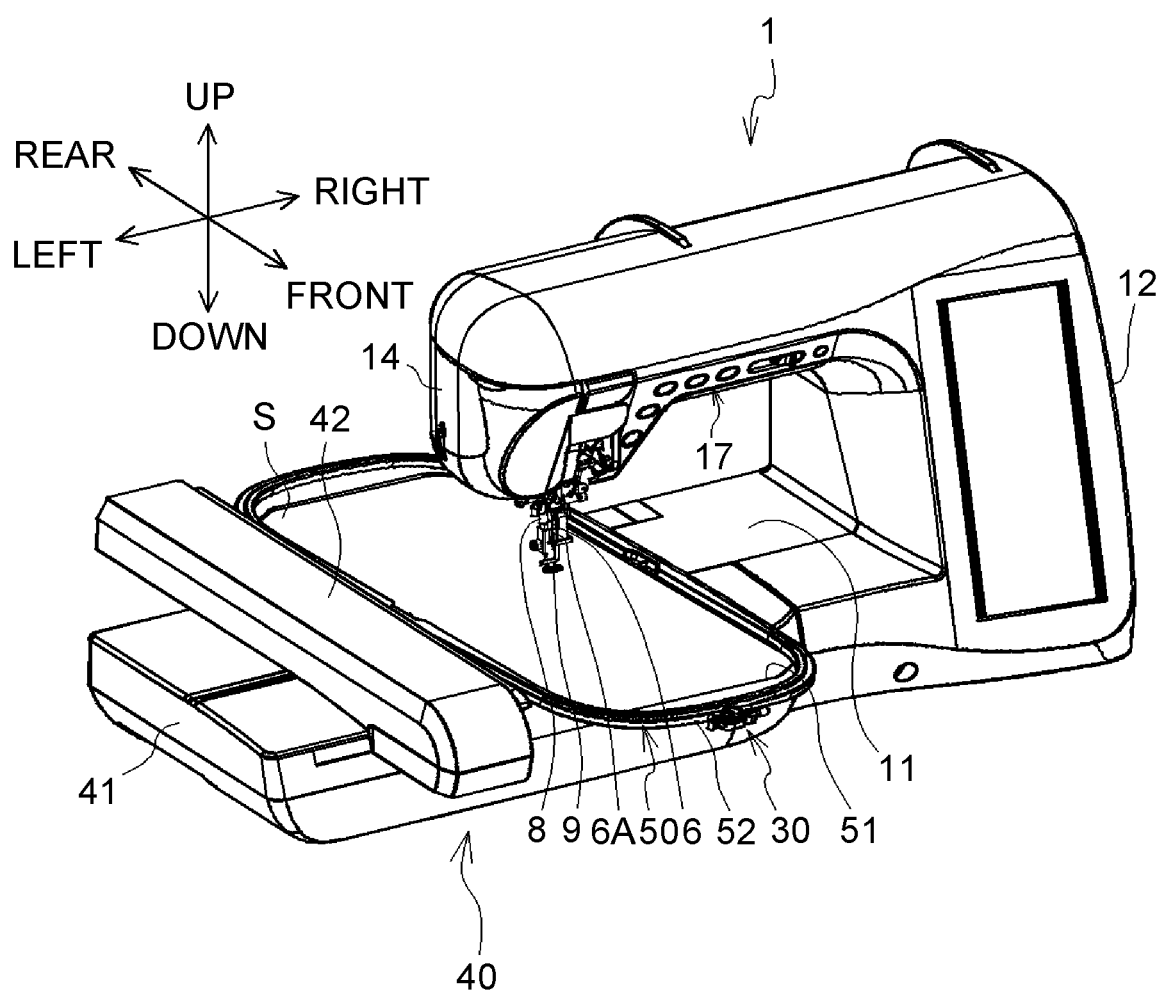
FIG. 1 is a perspective view of a sewing machine with an embroidery hoop attached, according to a first illustrative embodiment.

As shown in FIG. 1, a sewing machine 1 includes a bed 11, an upright arm 12, a horizontal arm 17, a head 14, and an embroidery moving device 40. In the following description, a front-rear direction, a left-right direction, and a vertical direction, which are shown by arrows in the drawings, are used. The bed 11 extends in the left-right direction. The upright arm 12 extends upward from a right end of the bed 11. The horizontal arm 17 extends leftward from an upper end of the upright arm 12 to face the bed 11. The head 14 is coupled to a distal end of the horizontal arm 17. The embroidery moving device 40 movably holds an embroidery hoop 50.

The upright arm 12 includes therein a sewing machine motor (not shown). The horizontal arm 17 includes therein a main shaft. The main shaft is driven to rotate by the sewing machine motor. The head 14 includes a needle bar 6 and a presser bar 8. A needle 6A is detachably attached to a lower end of the needle bar 6. A presser foot 9 is detachably attached to a lower end of the presser bar 8. The needle bar 6 is driven in the vertical direction by rotation of the main shaft.

As shown in FIG. 1, the embroidery moving device 40 includes a holder (not shown), a main body 41, and a carriage 42. The holder is disposed on a right side surface of the carriage 42. The embroidery hoop 50 is detachably attached to the holder. The embroidery hoop moving device 40 is configured to move the embroidery hoop 50 in the front-rear direction and in the left-right direction. The embroidery hoop moving device 40 thereby moves a workpiece S held by the embroidery hoop 50.

The main body 41 includes therein an X-axis moving mechanism (not shown) and an X-axis motor (not shown). The X-axis moving mechanism is driven by the X-axis motor to move the carriage 42 in the left-right direction (in an X-axis direction).

The carriage 42 includes a Y-axis moving mechanism (not shown) and a Y-axis motor (not shown). The Y-axis moving mechanism is driven by the Y-axis motor to move the holder in the front-rear direction (in a Y-axis direction).

Figure 2:
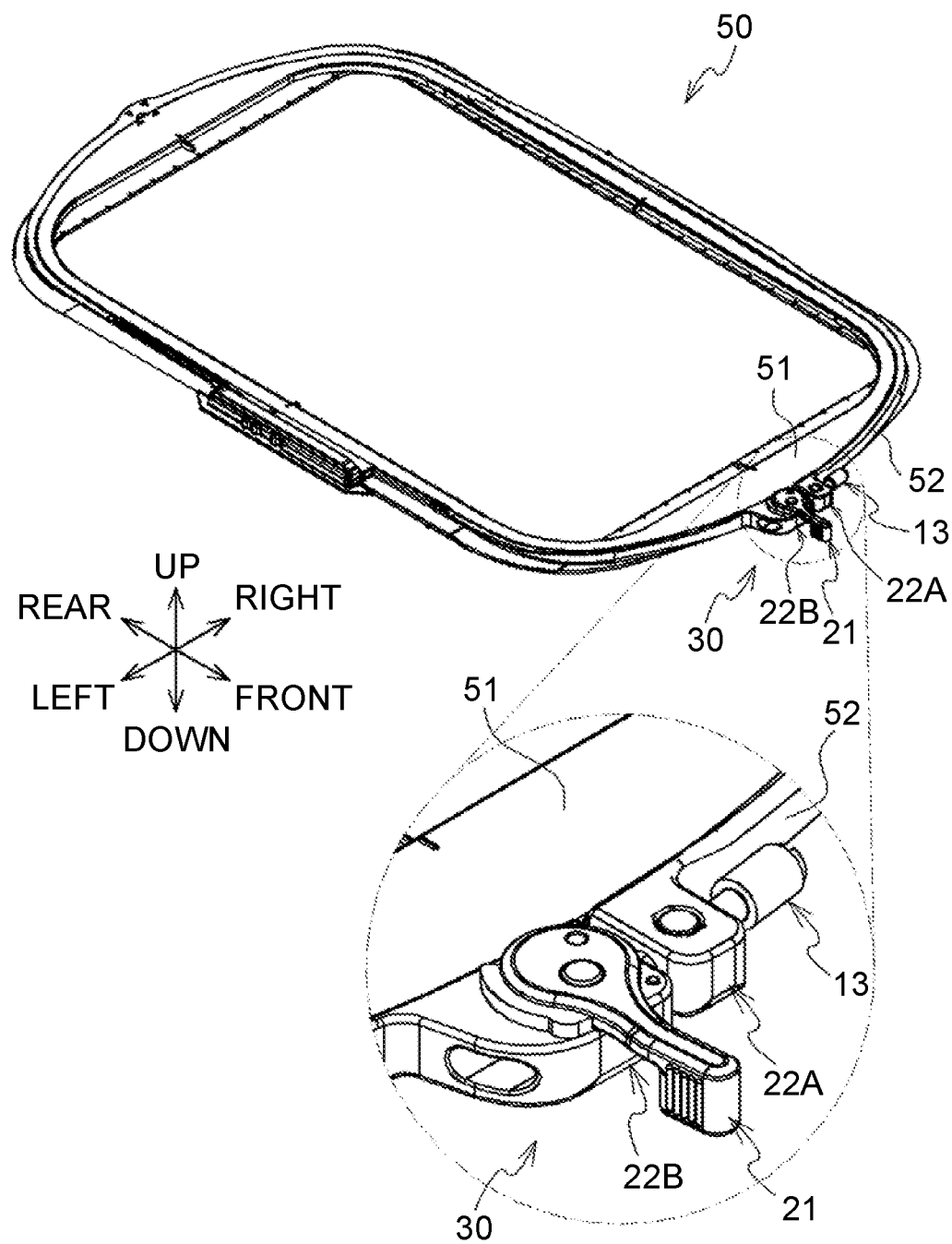
FIG. 2 is a perspective view of the embroidery hoop.
Figure 3:
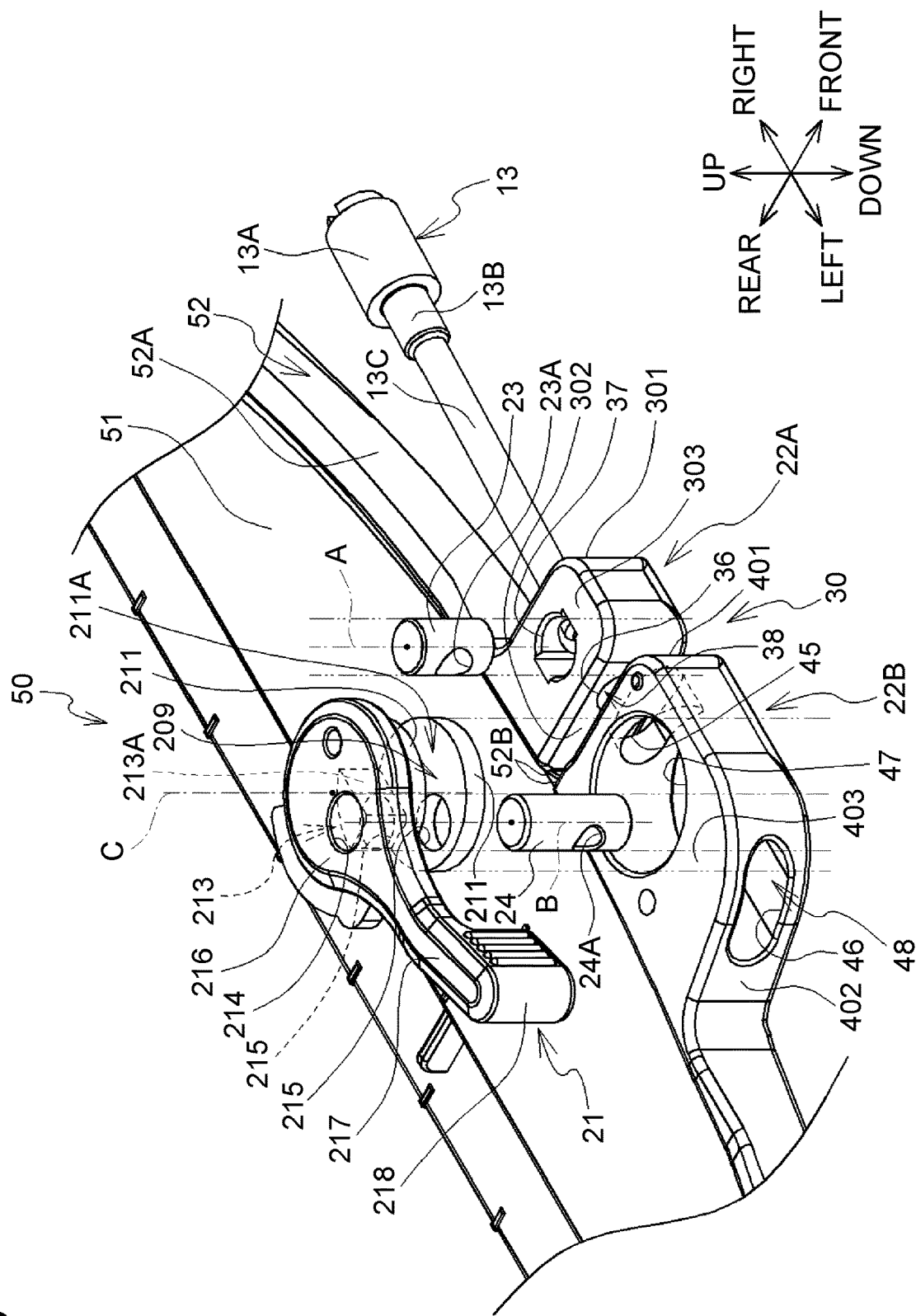
FIG. 3 is an exploded perspective view of a tightening mechanism.

Referring to FIGS. 1 to 3, the embroidery hoop 50 will be described. The embroidery hoop 50 holds a workpiece S in a horizontal direction. As shown in FIG. 2, the embroidery hoop 50 includes an outer ring 52, an inner ring 51, and a tightening mechanism 30. The outer ring 52 includes a ring-shaped portion 52A and a dividing portion 52B. The ring-shaped portion 52A has a substantially rectangular ring shape in plan view. The dividing portion 52B divides a substantially central portion of the front of the ring-shaped portion 52A in the left right direction and in the front-rear direction. The inner ring 51 has a substantially rectangular ring shape in plan view and is fitted inside the outer ring 52. The inner ring 51 is open in the vertical direction and faces the outer ring 52 in the horizontal direction. The tightening mechanism 30 is disposed at the dividing portion 52B. The tightening mechanism 30 tightens the outer ring 52 against the inner ring 51.

Referring to FIG. 3, the tightening mechanism 30 will be described. The tightening mechanism 30 includes a pair of screw mounts 22A and 22B, a lever 21, nuts 23 and 24, and an adjusting screw 13. The screw mounts 22A and 22B are respectively disposed on opposite sides of the dividing portion 52B in the left-right direction to oppose each other. The screw mount 22A is disposed on the right side of the dividing portion 52B and has a box shape substantially rectangular in plan view to extend in the front-rear direction. The screw mount 22A has a first surface 301, a second surface 302, and a third surface 303. The first surface 301 faces rightward, the second surface 302 faces leftward, and the third surface 303 faces upward. The third surface 303 connects an upper end of the first surface 301 and an upper end of the second surface 302.

The screw mount 22A has a through-hole 38 open in the left-right direction. The through-hole 38 is circular in side view. The through-hole 38 has insertion holes 35 and 36. The insertion hole 35 is a right end portion of the through-hole 38, and the insertion hole 36 is a left end portion of the through-hole 38. In other words, the insertion hole 35 is formed in the first surface 301, and the insertion hole 36 is formed in the second surface 302. The insertion hole 36 has an inner diameter slightly greater than the inner diameter of the insertion hole 35. The screw mount 22A also has an inserting hole 37. The inserting hole 37 is formed in the third surface 303. The inserting hole 37 is circular in plan view and open upward. The inserting hole 37 extends in the vertical direction. The through-hole 38 intersects the inserting hole 37 inside the screw mount 22A. Hereinafter, an axis passing through a center of the inserting hole 37 and extending in the vertical direction is referred to as a rotation axis A.

The screw mount 22B is disposed on the left side of the dividing portion 52B and has a box shape substantially rectangular in plan view to extend in the left-right direction. The screw mount 22B has a first surface 401, a second surface 402, and a third surface 403. The first surface 401 faces rightward, the second surface 402 faces leftward, and the third surface 403 faces upward. The third surface 403 connects an upper end of the first surface 401 and an upper end of the second surface 402.

The screw mount 22B has a through-hole 48 open in the left-right direction. The through-hole 48 is circular in side view. The through-hole 48 includes an insertion hole 45 and a hole 46. The insertion hole 45 is a right end portion of the through-hole 48, and the hole 46 is a left end portion of the through-hole 48. In other words, the insertion hole 45 is formed in the first surface 401, and the hole 46 is formed in the second surface 402. The insertion hole 45 has a slot shape with a hole diameter extending in the front-rear direction and has, for example, a long diameter substantially twice the outer diameter of a shaft 13C of the adjusting screw 13. The hole 46 has a slot shape with an inner diameter greater than the inner diameter of the insertion hole 45. The insertion hole 45 is visible to a user via the hole 46 from the left.

The screw mount 22B also has an inserting hole 47. The inserting hole 47 is formed in the third surface 403. The inserting hole 47 is substantially circular in plan view and open upward. The inserting hole 47 extends in the vertical direction. The through-hole 48 intersects the inserting hole 47 inside the screw mount 22B. Hereinafter, an axis passing through a center of the inserting hole 47 and extending in the vertical direction is referred to as a rotation axis C.

The lever 21 is rotatably held in the insertion hole 47 of the screw mount 22B. The lever 21 includes a base 209, a disc body 216, an extending portion 217, and an operative portion 218. The base 209 is rotatably fitted in the inserting hole 47. The base 209 rotates about the rotation axis C. The base 209 includes a contact 213 and a pair of opposing walls 211. The contact 213 has a substantially rectangular parallelepiped shape to extend in the vertical direction and is positioned offset from the rotation axis C. The contact 213 has a contact surface 213A. The contact surface 213A is a flat surface facing clockwise about the rotation axis C in plan view. The contact surface 213A extends in the vertical direction.

The pair of opposing walls 211 respectively protrude unidirectionally from an upper end and a lower end of the contact 213. The opposing walls 211 oppose each other in the vertical direction, with the contact 213 interposed therebetween. The opposing walls 211 define a C-shaped accommodating space 211A for accommodating therein the nut 24 to be described later.

The pair of opposing walls 211 each have a substantially disc shape in plan view. The opposing walls 211 each have an outer diameter substantially equal to the inner diameter of the inserting hole 47 of the screw mount 22B. The opposing walls 211 are slidably held in the inserting hole 47 in a state where the lever 21 is inserted in the screw mount 22B. The pair of opposing walls 211 have a pair of inserting holes 215. The pair of inserting holes 215 are circular in plan view and open in the vertical direction. The inserting holes 215 are arranged in the vertical direction at a position eccentric from the rotation axis C. Hereinafter, a centerline of the inserting holes 215 is referred to as a rotation axis B. The rotation axis B extends in the vertical direction at a position eccentric from the rotation axis C.

The disc body 216 is a disc having the rotation axis C as a center. The disc body 216 is fixed to an upper portion of the upper opposing wall 211. The disc body 216 has an inserting hole 214 open in the vertical direction. The inserting hole 214 extends in the vertical direction and is integrally formed with the upper inserting hole 215. The inserting hole 214 has an inner diameter equal to the inner diameter of each of the pair of inserting holes 215. The extending portion 217 extends unidirectionally from an end of the disc body 216. A unidirectional end of the extending portion 217 is connected to the operative portion 218. The operative portion 218 extends downward from the extending portion 217 (refer to FIG. 3). A user holds the operative portion 218 to operate the lever 21.

The nut 23 is cylindrical and extends in the vertical direction. The nut 23 has an axis coincident with the rotation axis A. The nut 23 is inserted in the inserting hole 37 of the screw mount 22A. The nut 23 is held in the inserting hole 37 slidably about the rotation axis A. The nut 23 has a through-hole 23A (refer to FIG. 3) penetrating, in the left-right direction, a substantially central portion thereof in the vertical direction. The through-hole 23A is located at a position in the vertical direction inside the through-hole 38. The nut 23 has an outer diameter substantially equal to the inner diameter of the inserting hole 37.

The nut 24 is cylindrical and extends in the vertical direction. The nut 24 has an axis coincident with the rotation axis B. The nut 24 is disposed at the lever 21. Specifically, the nut 24 is inserted in the inserting hole 214 of the lever 21 and in the pair of inserting holes 215 of the opposing walls 211. The inserting hole 214 and the pair of inserting holes 215 slidably hold the nut 24. In other words, the nut 24 is held by the lever 21. Thus, the nut 24 is rotatable inside the lever 21 about the rotation axis B which is eccentric from the rotation axis C. The nut 24 has a screw hole 24A at a substantially central portion thereof in the vertical direction. The screw hole 24A is open in the left-right direction and located at a position in the vertical direction inside the through-hole 48.

The adjusting screw 13 includes an operative portion 13A, a contact 13B, and the shaft 13C. The operative portion 13A is cylindrical, extends in the left-right direction (refer to FIG. 3), and is disposed to the right of the screw mount 22A. The contact 13B is cylindrical and extends in the left-right direction. The contact 13B extends leftward from a left end of the operative portion 13A and contacts the first surface 301. The contact 13B has an outer diameter which is less than the outer diameter of the operative portion 13A and is greater than the inner diameter of the insertion hole 35 in the first surface 301. The adjusting screw 13 is restricted from moving leftward by the contact 13B in contact with the first surface 301. The shaft 13C extends leftward from a left end of the contact 13B. The shaft 13C has an outer diameter less than the outer diameter of the contact 13B. The outer diameter of the shaft 13C is less than the inner diameter of the through-hole 38 and less than the inner diameter of the through-hole 48. The shaft 13C is inserted in the through-hole 38 of the screw mount 22A, the through-hole 23A of the nut 23, and the through-hole 48 of the screw mount 22B. The shaft 13C is threadedly engaged with the screw hole 24A of the nut 24. The outer diameter of the shaft 13C of the adjusting screw 13 is less than the inner diameter of the through-hole 23A of the nut 23. The shaft 13C is fitted in the through-hole 23A with clearance.

Figure 4:
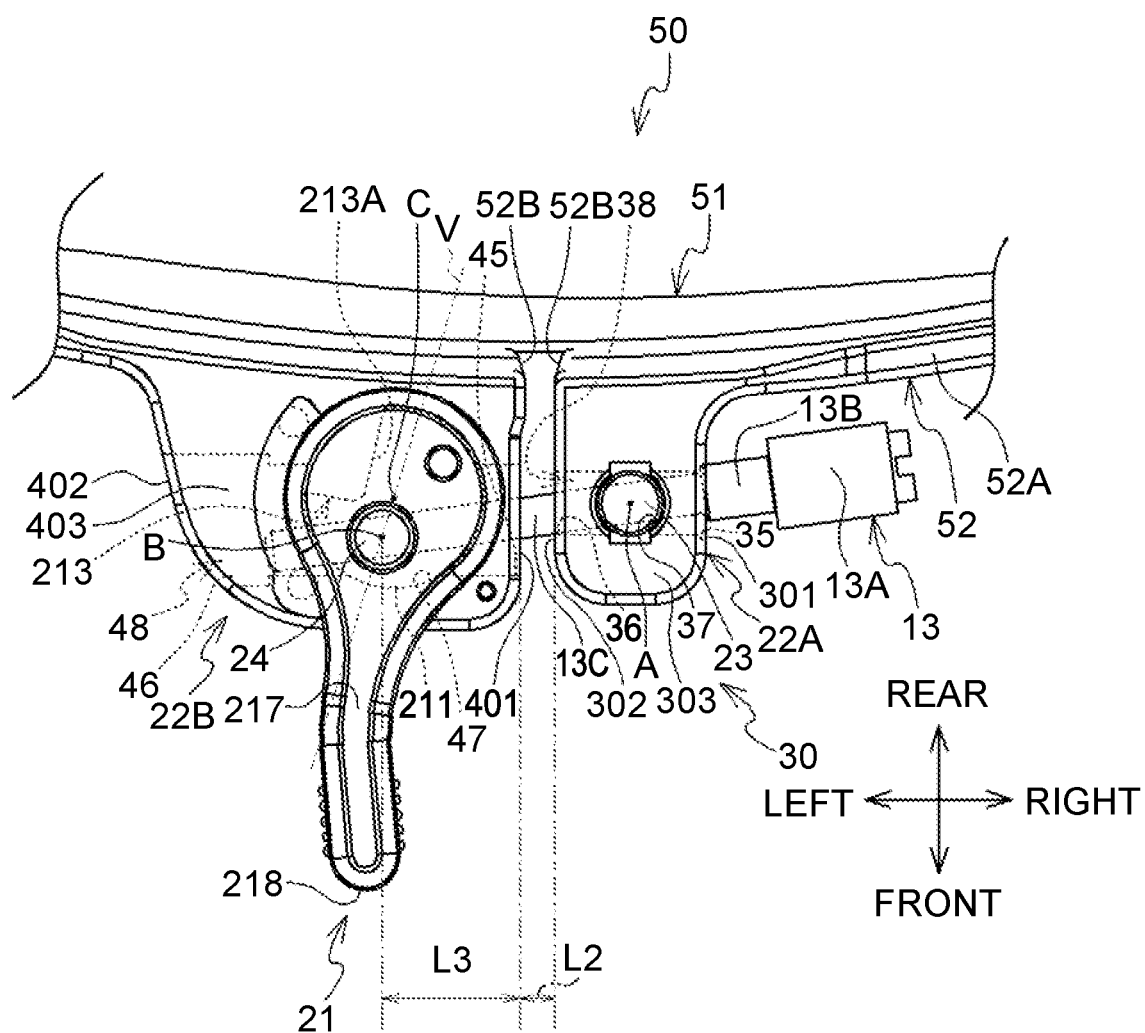
FIG. 4 is a plan view of the tightening mechanism when a lever is at a first position.
Figure 5:
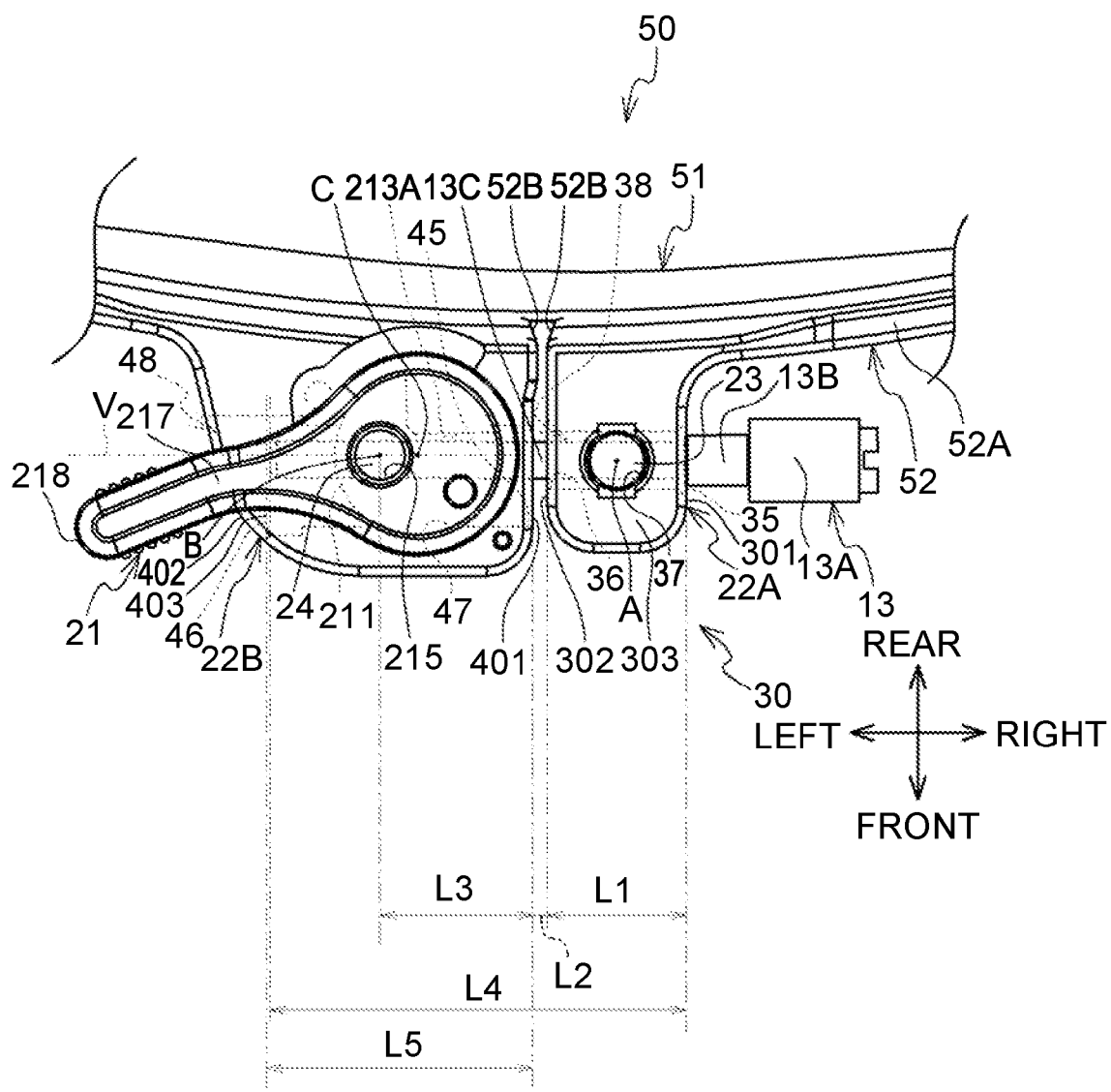
FIG. 5 is a plan view of the tightening mechanism when the lever is at a specific position.
Figure 6:
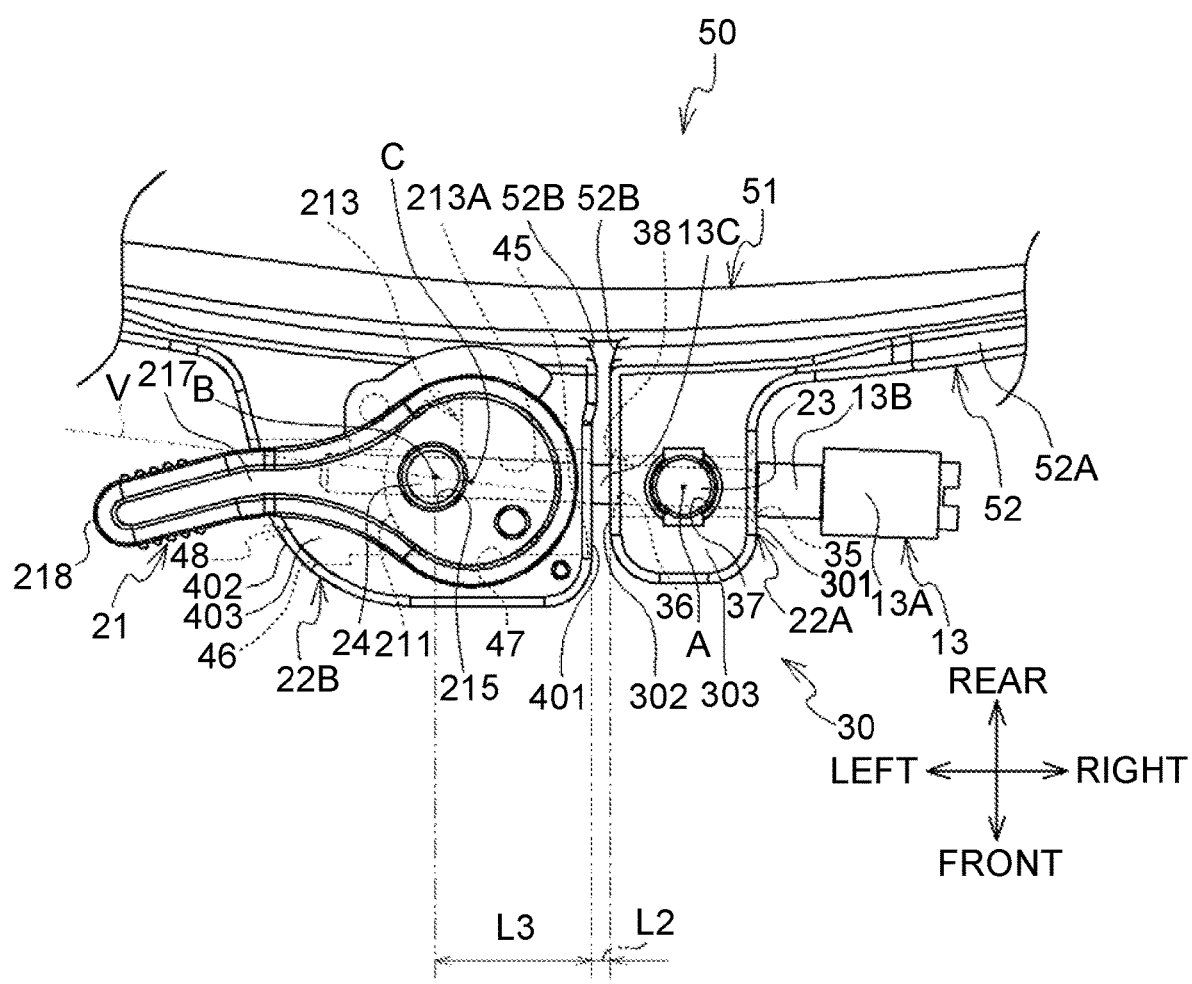
FIG. 6 is a plan view of the tightening mechanism when the lever is at a second position.

Referring to FIGS. 4 to 6, the rotation position of the lever 21 will be described. The lever 21 rotates about the rotation axis C between a first position (refer to FIG. 4) and a second position (refer to FIG. 6) via a specific position (refer to FIG. 5). The first position and the second position are positions at opposite ends of a rotatable range of the lever 21. The lever 21 rotates about the rotation axis C clockwise in plan view from the first position to the second position. The specific position is a rotation position of the lever 21, defined between the first position and the second position.

In the process of rotation of the lever 21 from the first position to the second position, a gap between the outer ring 52 and the inner ring 51 decreases such that the outer ring 52 closely contacts, along its extending direction, the inner ring 51 via a workpiece S. The contact 13B of the adjusting screw 13 is maintained in contact with the first surface 301 of the screw mount 22A, regardless of the rotation position of the lever 21.

When the lever 21 is at the first position (refer to FIG. 4), the rotation axis B is located at a front-left position relative to the rotation axis C, and the shaft 13C of the adjusting screw 13 extends from the rear right toward the front left. The contact surface 213A is located behind the shaft 13C and faces toward the front right. The axis (i.e., the rotation axis B) of the nut 24 is located in front of the rotation axis C about which the lever 21 rotates. An imaginary straight line (hereinafter referred to as an imaginary straight line V), which orthogonally intersects the rotation axis C and the rotation axis B, extends from the rear right toward the front left so as not to be parallel to an extending direction of the shaft 13C.

When the lever 21 is at the specific position (refer to FIG. 5), the rotation axis B is located to the left of the rotation axis C, and the shaft 13C extends in the left-right direction. The contact surface 213A faces the shaft 13C from behind while leaving a clearance. The rotation axis B of the nut 24 is located further to the left than when the lever 21 is at the first position. When the lever 21 is at the specific position, the shaft 13C of the adjusting screw 13 extends in the left-right direction. The imaginary straight line V extends in the left-right direction to be parallel to the shaft 13C.

When the lever 21 is at the second position (refer to FIG. 6), the rotation axis B is located at a rear left position relative to the rotation axis C, and the shaft 13C extends from the front right toward the rear left. The contact surface 213A faces and contacts the shaft 13C from behind. The imaginary straight line V extends from the rear left toward the front right so as not to be parallel to the extending direction of the shaft 13C. When the lever 21 is at the second position, the contact surface 213A contacts the shaft 13C of the adjusting screw 13 (refer to FIG. 6). This restricts the lever 21 from rotating from the second position clockwise in plan view.

Referring to FIGS. 4 to 6, distances L1 and L2, a specific distance L3, and distances L4 and L5 will be described. The distance L1 is the shortest distance in the left-right direction from the first surface 301 to the second surface 302 (refer to FIG. 5). The distance L1 is constant, regardless of the rotation position of the lever 21. The distance L2 is the shortest distance in the left-right direction from the second surface 302 of the screw mount 22A to the first surface 401 of the screw mount 22B. In hoop tightening, a tightening force of the tightening mechanism 30 increases as the distance L2 becomes shorter. The specific distance L3 is the shortest distance in the left-right direction from the first surface 401 of the screw mount 22B to the rotation axis B of the nut 24. The distance L2 and the specific distance L3 vary depending on the rotation position of the lever 21. The distance L4 is a length in the left-right direction of the shaft 13C of the adjusting screw 13. The distance L5 is the shortest distance in the left-right direction between the first surface 401 and the hole 46.

The distance L2 when the lever 21 is at the specific position is shorter than when at the first position and shorter than when at the second position. When the lever 21 is at the specific position, the distance L2 is shortest. In other words, when the lever 21 is at the specific position, the pair of screw mounts 22A and 22B are closest to each other. The specific length L3 is longer than when the lever 21 is at the first position, by a distance that the nut 24 (i.e., the rotation axis B) shifts leftward in the left-right direction. When the lever 21 is at the specific position, the nut 24 is located at the leftmost position.

As shown in FIG. 5, when the lever 21 is at the specific position, a left end of the shaft 13C of the adjusting screw 13 is closest to the second surface 402. The sum (L1+L2+L5) of the distances L1, L2, and L5 is greater than the distance L4 (refer to FIG. 5). Thus, the left end of the shaft 13C does not protrude leftward beyond the second surface 402, regardless of the rotation position of the lever 21. The left end of the shaft 13C is hardly visible to a user, regardless of the rotation position of the lever 21, thereby improving the appearance of the embroidery hoop 50.

The distance L2 when the lever 21 is at the second position is shorter than when at the first position. The distance L2 when the lever 21 is at the second position is slightly longer than when at the specific position. The specific length L3 when the lever 21 is at the second position is longer than when at the first position, by a distance that the nut 24 shifts in the left-right direction. The specific length L3 when the lever 21 is at the second position is slightly shorter than when at the specific position, by a distance that the nut 24 shifts in the left-right direction.

Referring to FIGS. 4 to 6, tightening of the embroidery hoop 50 will be described. Before hoop tightening is started, the lever 21 is located at the first position. After placing a workpiece S between the outer ring 52 and the inner ring 51, a user holds the operative portion 218 to rotate the lever 21 toward the second position.

In the process of rotation of the lever 21 from the first position (refer to FIG. 4) toward the specific position (refer to FIG. 5), the nut 24 rotates about the rotation axis C and moves leftward and rearward. At the same time, the nut 24 rotates about the rotation axis B clockwise in plan view. As the nut 24 rotates about the rotation axis C, the adjusting screw 13 rotates, about a contact position between the contact 13B and the first surface 301, clockwise in plan view. At this time, rotation of the shaft 13C is not restricted by the through-hole 23A. The nut 24, which moves leftward, urges leftward the adjusting screw 13 threadedly engaged with the nut 24. The contact 13B, which is in contact with the first surface 301 of the screw mount 22A, urges the screw mount 22A leftward. Accordingly, the screw mount 22A moves leftward. As the lever 21 rotates toward the specific position, the distance L2 between the pair of screw mounts 22A and 22B gradually decreases. The outer ring 52 is thus gradually tightened against the inner ring 51. As the lever 21 rotates toward the specific position, a force required to rotate the lever 21 increases. Until the lever 21 reaches the specific position, the outer ring 52 closely contacts the inner ring 51 along its extending direction to hold the workpiece S therebetween. The outer ring 52 and the inner ring 51 hold the workpiece S therebetween in a horizontal direction.

In the process of rotation of the lever 21 from the specific position (refer to FIG. 5) to the second position (refer to FIG. 6), the nut 24 further rotates about the rotation axis C and moves rightward and rearward. The nut 24 further rotates about the rotation axis B clockwise in plan view. The adjusting screw 13 further rotates, about the contact position between the contact 13B and the first surface 301, clockwise in plan view. At this time, rotation of the shaft 13C is not restricted by the through-hole 23A, either. The nut 24, which moves rightward, reduces a leftward urging force of the adjusting screw 13 and moves back the screw mount 22A slightly rightward. As the lever 21 rotates toward the second position, the distance L2 between the pair of screw mounts 22A and 22B gradually increases. The outer ring 52 is thus slightly loosened from the inner ring 51. As the lever 21 rotates from the specific position toward the second position, a force required to rotate the lever 21 decreases. The contact surface 213A contacts the shaft 13C, and the lever 21 reaches the second position. The contact surface 213A in contact with the shaft 13C restricts the lever 21 from rotating about the rotation axis C clockwise in plan view and positions the lever 21 at the second position. A tightening force reduced as the lever 21 rotates from the specific position to the second position is extremely small as compared with a tightening force increasing as the lever 21 rotates from the first position to the specific position. Thus, there is no problem with the tightening force of the tightening mechanism 30 when the lever 21 is at the second position. When the lever 21 is at the second position, the outer ring 52 and the inner ring 51 hold the workpiece S therebetween. Thus, only by rotating the lever 21 from the first position to the second position, the user is allowed to tighten the outer ring 52 against the inner ring 51 to attach the workpiece S to the embroidery hoop 50.

Referring to FIG. 4, adjustment of the distance L2 will be described. By turning the operative portion 13A clockwise or counterclockwise in right side view, the user is allowed to adjust the distance L2 between the pair of screw mounts 22A and 22B. The user turns the operative portion 13A clockwise in right side view. Because the left end of the contact 13B is in contact with the first surface 301 of the screw mount 22A, a force directed rightward is applied to the nut 24. Because the nut 24 is fixedly positioned in the lever 21, a force directed rightward is applied to the screw mount 22B. The screw mount 22B moves rightward toward the screw mount 22A, thereby reducing the distance L2.

When the user turns the operative portion 13A counterclockwise in right side view, a force directed leftward is applied to the nut 24 because the left side of the contact 13B is in contact with the first surface 301 of the screw mount 22A. Because the nut 24 is fixedly positioned in the lever 21, a force directed leftward is applied to the screw mount 22B. The screw mount 22B moves leftward away from the screw mount 22A, thereby increasing the distance L2. Thus, the user is allowed to adjust a tightening force (i.e., a clamping force) to the workpiece S by the tightening mechanism 30 when the lever 21 rotates from the first position to the second position. The user may adjust the distance L2 as appropriate according to the thickness of the workpiece S.

As described above, the embroidery hoop 50 according to the first illustrative embodiment includes the outer ring 52, the inner ring 51, the pair of screw mounts 22A and 22B, and the lever 21. The outer ring 52 includes the ring-shaped portion 52A and the dividing portion 52B which divides a portion of the ring-shaped portion 52A. The inner ring 51 is fitted inside the outer ring 52 to hold the workpiece S therebetween. The pair of screw mounts 22A and 22B are disposed at the dividing portion 52B to oppose each other. The lever 21 is disposed at the screw mount 22B to be rotatable about the rotation axis C between the first position and the second position. The nut 24 is slidably held at a position eccentric from the rotation center of the lever 21. The adjusting screw 13 is mounted across the pair of screw mounts 22A and 22B and threadedly engaged with the nut 24. When the lever 21 is at the second position, the specific distance L3, which is the shortest distance between the nut 24 and the first surface 401 of the screw mount 22B facing the other screw mount 22A, is longer than when the lever 21 is at the first position.

In the above-described structure, when the user rotates the lever 21 from the first position to the second position, the nut 24 rotates together with the lever 21 while being maintained threadedly engaged with the adjusting screw 13. As the pair of screw mounts 22A and 22B move toward each other, the outer ring 52 is tightened against the inner ring 51. Only by rotating the lever 21 from the first position to the second position, the user is allowed to readily tighten the outer ring 52 against the inner ring 51. Thus, the embroidery hoop 50 is readily tightened.

The lever 21 is rotatable, via the specific position, between the first position and the second position. The specific position is a rotation position of the lever 21 where the specific distance L3 is longest. The lever 21 rotates to the second position via the specific position where the greatest force is required to rotate the lever 21. In the process of rotation of the lever 21 from the second position toward the specific position, the outer ring 52 is tightened against the inner ring 51. Thus, the force required for the user to rotate the lever 21 from the second position toward the specific position increases as the lever 21 moves toward the specific position. This makes the lever 21 at the second position hard to rotate toward the specific position. The lever 21 is stabilized at the second position, and the embroidery hoop 50 is enabled to maintain an appropriate tightening force.

The insertion hole 45 has a slot shape extending in the front-rear direction and has a long diameter, for example, substantially twice the outer diameter of the shaft 13C of the adjusting screw 13. When the user rotates the lever 21, the nut 24 at a position eccentric from the rotation axis C, which is the rotation center of the lever 21, rotates in the front-rear direction which is a long-diameter direction of the insertion hole 45. The long diameter of the insertion hole 45 is substantially twice the outer diameter of the shaft 13C of the adjusting screw 13. Thus, in the embroidery hoop 50, contact is reduced between an inner periphery of the insertion hole 45 and the shaft 13C of the adjusting screw 13. This makes the lever 21 easy to rotate and allows the user to readily perform hoop tightening.

The lever 21 has the contact surface 213A which contacts the shaft 13C of the adjusting screw 13 in the process of rotation of the lever 21 toward the second position. The contact surface 213A of the contact 213 is in contact with the shaft 13C, thereby restricting the lever 21 at the second position from rotating about the rotation axis C clockwise in plan view. The lever 21 is unlikely to rotate from the second position toward the specific position. The lever 21 is stably positioned at the second position, and thus the tightening mechanism 30 of the embroidery hoop 50 is enabled to stabilize a tightening force to the workpiece S.

The pair of opposing walls 211 define therebetween the accommodating space 211A for accommodating the nut 24. The shaft 13C of the adjusting screw 13 is disposed inside the lever 21, and thus the embroidery hoop 50 is downsized.

The screw mount 22B has the through-hole 48 open in the left-right direction. The adjusting screw 13 is inserted in the through-hole 48. The adjusting screw 13 is fairly visible to the user through the hole 46. This allows the user to readily perform hoop tightening.

The rotation axis C of the lever 21 extends in parallel with the vertical direction in which the inner ring 51 is open. Even when the lever 21 rotates, the position of the lever 21 remains unchanged in the vertical direction in which the inner ring 51 is open. This facilitates the user to rotate the lever 21.

When the lever 21 is at the specific position, the sum of the distances L1, L2, and L5 is greater than the distance L4 (refer to FIG. 5). The distances L1 and L5 are constant regardless of the rotation position of the lever 21, and the distance L2 is shortest when the lever 21 is at the specific position. Thus, the sum of the distances L1, L2, L5 is greater than the distance L4, regardless of the position of the lever 21. In other words, the shaft 13C of the adjusting screw 13 does not protrude leftward beyond the hole 46. The left end of the shaft 13C is hardly visible to the user. This improves the appearance of the embroidery hoop 50.

In the above description, the nut 24 is an example of a nut according to an aspect of the disclosure. The through-hole 48 is an example of a first insertion hole according to an aspect of the disclosure. The contact surface 213A is an example of a restrictor according to an aspect of the disclosure. The through-hole 38 is an example of a second insertion hole according to an aspect of the disclosure.

The disclosure may not be limited to the above-described illustrative embodiment, and various changes may be applied therein. The sewing machine 1 may be changed in structure as appropriate. The sewing machine 1 may be sewing machines adapted to other uses, such as a multi-needle sewing machine. The embroidery hoop moving device 40 may be integrally formed with the sewing machine 1. As long as the embroidery hoop 50 attachable to the embroidery moving device 40 includes the inner ring 51, the outer ring 52, and the tightening mechanism 30, the embroidery hoop 50 may hold a workpiece S, for example, in the vertical direction, instead of in the horizontal direction. The embroidery hoop 50 may be changed in shape as appropriate. For example, the embroidery hoop 50 may be circular. The tightening mechanism 30 may be changed in structure as appropriate. The structure of the tightening mechanism 30 may be used for other devices than sewing machines.

The lever 21 may be mounted at the screw mount 22A, instead of at the screw mount 22B. In this case, the nut 24 and the like are also mounted at the screw mount 22A, and the adjusting screw 13 is inserted from the screw mount 22B. The nut 23 may not be provided. In this case, any mechanism may be used as long as the distance L2 between the pair of screw mounts 22A and 22B is adjustable. The nut 23 may be threadedly engaged with the adjusting screw 13. The adjusting screw 13 is inserted from the screw mount 22A toward the screw mount 22B, but may be inserted front the screw mount 22B toward the screw mount 22A. Tightening of the lever 21 is completed at the second position, but may be completed at other positions, for example, at the specific position. When the lever 21 is at the second position, the contact surface 213A may not contact the shaft 13C. In this case, it is preferable that a portion of the lever 21 contacts, for example, a portion of the outer ring 52 to be restricted from rotating. The insertion hole 45 has a long diameter substantially twice the outer diameter of the shaft 13C of the adjusting screw 13, but may have a long diameter more than twice the outer diameter of the shaft 13C. This reduces further the chance that the insertion hole 45 contacts the shaft 13C. The screw mount 22B may have an opening whose left portion is closed, instead of the through-hole 48 open in the left-right direction. In other words, the hole 46 may not be formed in the second surface 402. When the lever 21 is at the specific position, the left end of the shaft 13C may protrude leftward beyond the second surface 402. Even in this case, unless the left end of the shaft 13C protrudes beyond the second surface 402 when the lever 21 is at the first position and the second position, the left end of the shaft 13C is hardly visible to the user during rotation of the lever 21 between the first position and the second position. This improves the appearance of the embroidery hoop 50.

Figure 7:
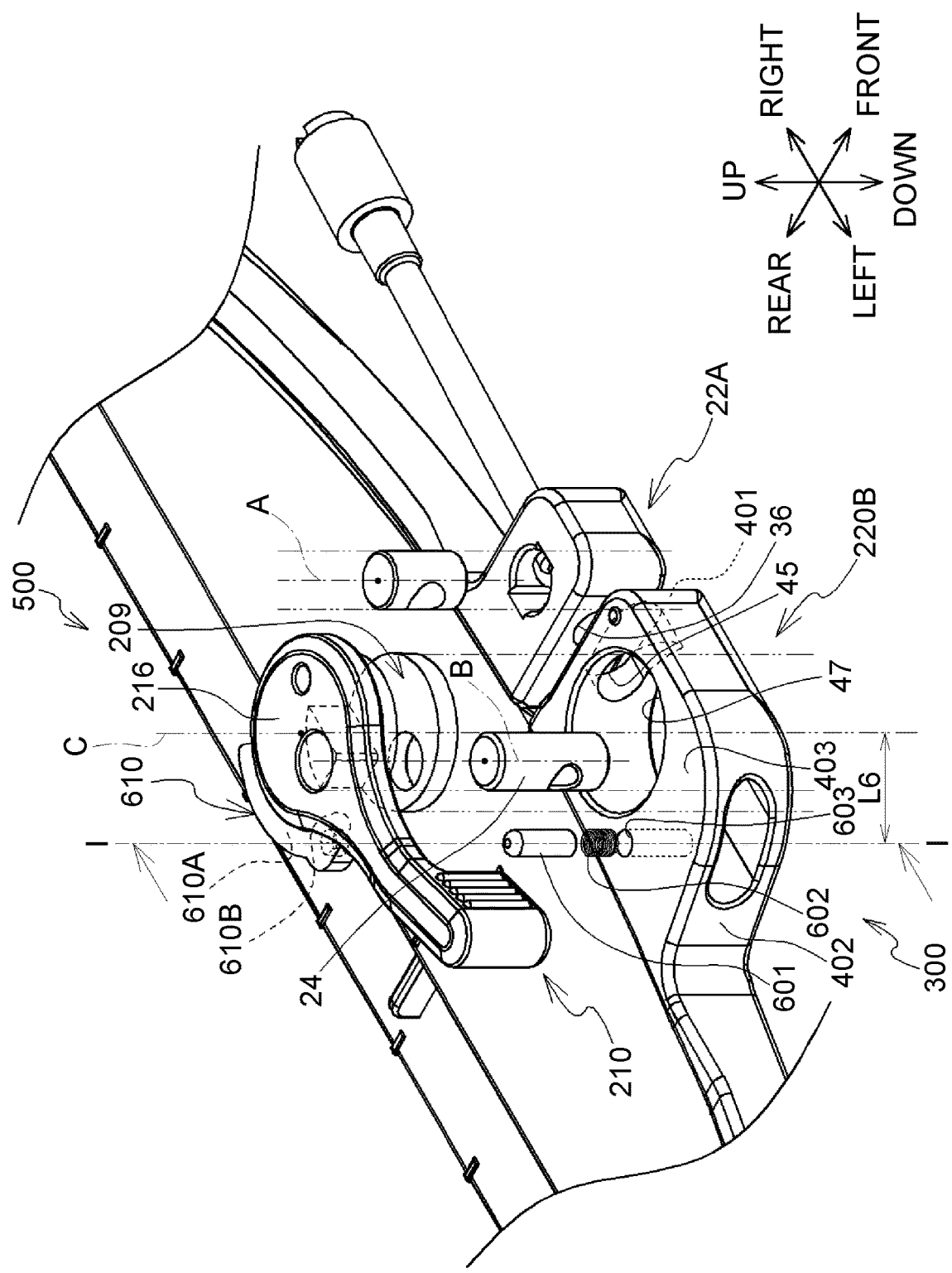
FIG. 7 is an exploded perspective view of a tightening mechanism of an embroidery hoop, according to a second illustrative embodiment.
Figure 8:
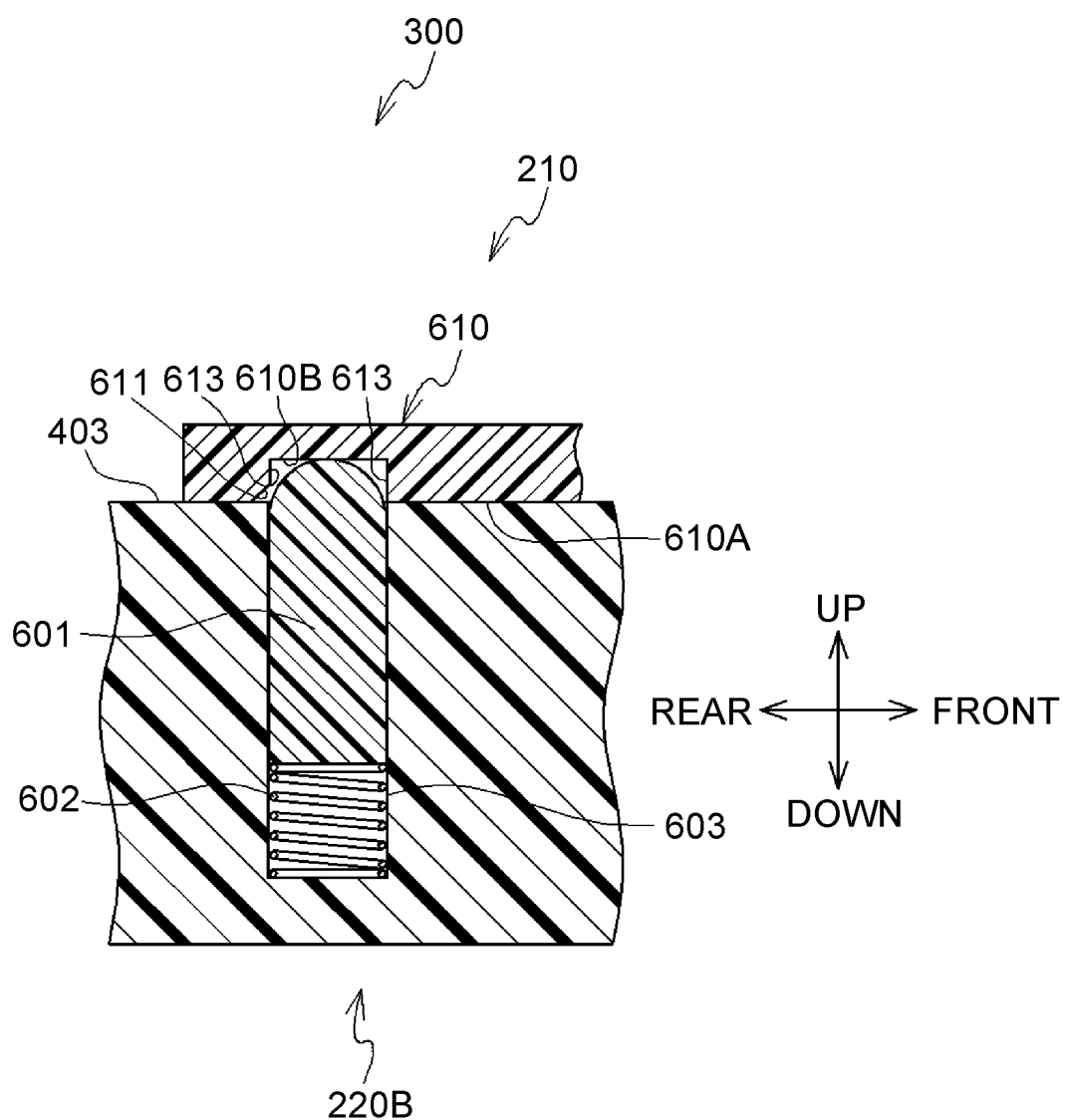
FIG. 8 is a cross-sectional view of the tightening mechanism viewed in arrows I-I in FIG. 7.

Referring to FIGS. 7 and 8, a second illustrative embodiment will be described. Similar elements as those in the first illustrative embodiment will be indicated by the same reference numbers, and a detailed description thereof will be omitted. An embroidery hoop 500 includes a tightening mechanism 300, instead of the tightening mechanism 30. The tightening mechanism 300 of the embroidery hoop 500 includes a screw mount 220B, instead of the screw mount 22B. The screw mount 220B differs from the screw mount 22B in that the screw mount 220B includes a hole 603, a coil spring 602, and a pin 601. The hole 603 is formed in a third surface 403 and is located at a rear left position of an inserting hole 47 (refer to FIG. 7). The hole 603 extends in the vertical direction (refer to FIG. 8). Hereinafter, the shortest distance between the center of the hole 603 and a rotation axis C is referred to as L6. The coil spring 602 is disposed inside the hole 603 to be oriented along the vertical direction. The coil spring 602 has an outer diameter substantially equal to the inner diameter of the hole 603. A lower end of the coil spring 602 contacts a bottom surface of the hole 603. The pin 601 extends in its axial direction along the vertical direction, and is disposed above the coil spring 602. The pin 601 has an outer diameter substantially equal to the inner diameter of the hole 603. The pin 601 compresses the coil spring 602 downward (refer to FIGS. 7 and 8). In other words, the coil spring 602 urges the pin 601 upward.

The tightening mechanism 300 includes a lever 210, instead of the lever 21. The lever 210 in FIG. 7 is located at the second position. The lever 210 differs from the lever 21 in that the lever 210 includes a wall 610. The wall 610 is disposed behind a base 209 of the lever 210 and extends arcuately about the rotation axis C (refer to FIG. 7). The wall 610 includes a slide surface 610A and a hole 610B. The slide surface 610A is disposed at a position protruding from the base 209 outward in a radial direction about the rotation axis C. The slide surface 610A is formed on a lower surface of the wall 610 at such a position that the shortest distance from the rotation axis C is the distance L6, and extends arcuately about the rotation axis C.

The hole 610B is formed in the lower surface of the wall 610 at such a position that the shortest distance from the rotation axis C is the distance L6, and is open downward (refer to FIGS. 7 and 8). The hole 610B is formed at a left end of the slide surface 610A (refer to FIG. 7). The hole 610B has an inner peripheral surface 613 and a tapered surface 611. The inner peripheral surface 613 extends in the axial direction of the pin 601. One end of the tapered surface 611 is connected to a lower end of the inner peripheral surface 613 of the hole 610B. The other end of the tapered surface 611 is connected to the slide surface 610A. The shortest distance between the pin 601 and the rotation axis C and the shortest distance between the slide surface 610A and the rotation axis C are the distance L6. Thus, when the lever 210 rotates, an upper end of the pin 601 slides on the slide surface 610A.

Tightening of the embroidery hoop 500 will be described. Before hoop tightening is started, the lever 210 is located at a first position. The slide surface 610A contacts the upper end of the pin 601 urged upward. After placing a workpiece S between an outer ring 52 and an inner ring 51, a user holds an operative portion 218 to rotate the lever 210 toward a second position.

In the process of rotation of the lever 210 toward the second position, the slide surface 610A rotates clockwise in plan view about the rotation axis C while sliding on the upper end of the pin 601. In short, when the lever 210 rotates toward the second position, the slide surface 610A rotates clockwise in plan view about the rotation axis C while sliding on the upper end of the pin 601.

Immediately before the lever 210 reaches the second position, the pin 601 slides on the tapered surface 611. Because the pin 601 is biased upward by the coil spring 602, the upper end of the pin 601 moves upward while sliding on the tapered surface 611. When the lever 210 reaches the second position, the pin 601 is urged further upward due to an upward urging force of the coil spring 602. The pin 601 is thereby inserted into the hole 610B. In the embroidery hoop 500, when the lever 210 is at the second position, the pin 601 inserted in the hole 610B restricts the lever 210 from rotating clockwise and counterclockwise in plan view. This makes the lever 210 hard to rotate from the second position. Thus, the embroidery hoop 500 is enabled to maintain an appropriate tightening force.

As described above, the pin 601 inserted in the hole 610B when the lever 210 is at the second position restricts the lever 210 from rotating from the second position. This enables the embroidery hoop 500 to maintain an appropriate tightening force.

When the lever 21 rotates, the tapered surface 611 guides the pin 601 toward the inside of the hole 610B to facilitate insertion of the pin 601 into the hole 610B. Thus, the lever 210 readily rotates to the second position.

When the lever 210 rotates to the second position, the pin 601 is readily inserted into the hole 610B due to an urging force of the coil spring 602. Thus, in the tightening mechanism 300, the lever 210 rotating from the first position toward the second position is reliably restricted from rotating from the second position.

The disclosure may not be limited to the above-described illustrative embodiment, and various changes may be applied therein. The pin 601 may be inserted into the hole 610B when the lever 210 is, for example, at the specific position, instead of when the lever 210 is at the second position. The lever 210 is thereby positioned at such a position that the outer ring 52 is tightened fully against the inner ring 51. In this case, it is preferable that a contact surface 213A is positioned to contact the shaft 13C when the lever 210 is at the specific position. The hole 603 is located at the screw mount 220B, but may be located at the wall 610 of the lever 210. In this case, the hole 610B is located at the screw mount 220B, the coil spring 602 and the pin 601 are inserted in the hole 603 located at the wall 610 of the lever 210, and the pin 601 is inserted into the hole 610B when the lever 210 is at the second position.

The pin 601 is inserted into the hole 610B due to an urging force of the coil spring 602 when the lever 210 is at the second position, but may protrude beyond the third surface 403 at all times. In this case, the slide surface 610A has a groove in which the pin 601 is located to move. The tapered surface 611 may not be provided. The rotation axis C of the lever 210 may extend, for example, in the front-rear direction, instead of in the vertical direction. In this case, the lever 210 rotates in the vertical direction.

In the description of the second illustrative embodiment, the pin 601, the slide surface 610A, and the hole 610B are an example of a restrictor according to an aspect of the disclosure. The coil spring 602 is an example of an urging member according to an aspect of the disclosure.

What is claimed is:

1. An embroidery hoop comprising:
  an outer ring including a ring-shaped portion, and a dividing portion dividing a portion of the ring-shaped portion;
  an inner ring fitted inside the outer ring to hold a workpiece therebetween;
  a pair of screw mounts disposed at the dividing portion to oppose each other;
  a lever disposed at one of the pair of screw mounts and rotatable about a rotation axis between a first position and a second position;
  a restrictor configured to restrict rotation of the lever at the second position;
  a nut slidably held in the lever at a position eccentric from the rotation axis; and
  an adjusting screw mounted across the pair of screw mounts and threadedly engaged with the nut,
  wherein the one of the pair of screw mounts has a first surface facing the other screw mount, and a shortest distance between the first surface and the nut is defined as a specific distance, the specific distance when the lever is at the second position being longer than the specific distance when the lever is at the first position, wherein the lever is rotatable, via a specific position, between the first position and the second position, and the specific distance is longest when the lever is at the specific position, wherein the specific position is different from the second position position, and wherein the restrictor includes:
- a pin disposed at one of the lever and the one of the pair of screw mounts, the pin being parallel to the rotation axis and spaced apart by a first distance from the rotation axis,
- a slide surface which is disposed at the other of the lever and the one of the pair of screw mounts and on which the pin slides when the lever rotates from the first position toward the second position, and
- a hole formed in the slide surface at a position spaced apart by the first distance from the rotation axis, and configured to receive the pin when the lever is at the second position.

2. The embroidery hoop according to claim 1, wherein the one of pair of screw mounts has a first insertion hole formed in the first surface and receiving therein the adjusting screw, the first insertion hole having a slot shape extending through the first surface and to an axial direction of the rotation axis, and having a diameter more than twice an outer diameter of a shaft of the adjusting screw.

3. The embroidery hoop according to claim 1, wherein the restrictor includes a contact portion disposed at the lever and configured to, when the lever rotates toward the second position, contact a shaft of the adjusting screw and position the lever at the second position.

4. The embroidery hoop according to claim 3, wherein the lever includes a pair of opposing walls holding the nut and respectively extending from opposite ends of the contact portion, and the opposing walls oppose each other to leave therebetween a space for the shaft of the adjusting screw and the nut.

5. The embroidery hoop according to claim 1, wherein the hole has an inner peripheral surface extending in an axial direction of the pin, and a tapered surface connecting an end of the slide surface and an end of the inner peripheral surface in a facing direction of the slide surface.

6. The embroidery hoop according to claim 1, wherein the restrictor further includes an urging member configured to urge the pin in a direction opposite to the facing direction of the slide surface.

7. The embroidery hoop according to claim 1, wherein the one of the pair of screw mounts has a second surface opposite to the first surface and a first insertion hole formed in the first surface and receiving therein the adjusting screw, and the first insertion hole is open through the first surface and the second surface.

8. The embroidery hoop according to claim 1, wherein the rotation axis extends in parallel with a direction in which the inner ring is open.

9. The embroidery hoop according to claim 1,
wherein the one of the pair of screw mounts has a first insertion hole receiving therein the adjusting screw,
wherein the other screw mount has a second insertion hole receiving therein the adjusting screw, and
wherein a sum of a length of the first insertion hole, a length of the second insertion hole, and a shortest length from the first surface to the other screw mount when the lever is at the second position is greater than a length of a shaft of the adjusting screw in a shaft extending direction.

\* \* \* \* \*